United States Patent
Sautter et al.

(10) Patent No.: US 6,810,729 B2
(45) Date of Patent: Nov. 2, 2004

(54) RAIN SENSOR WITH A LIGHT-CONDUCTING BODY FOR A MOTOR VEHICLE

(75) Inventors: Helmut Sautter, Ditzingen (DE); Bruno Hodapp, Achern-Oensbach (DE); Rainer Pientka, Renchen (DE); Hans Meier, Ottersweier (DE); Andreas Schneider, Buehl (DE); Manfred Burkart, Iffezheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/182,514

(22) PCT Filed: Nov. 7, 2001

(86) PCT No.: PCT/DE01/04182

§ 371 (c)(1),
(2), (4) Date: Jul. 31, 2002

(87) PCT Pub. No.: WO02/46006

PCT Pub. Date: Jun. 13, 2002

(65) Prior Publication Data

US 2003/0074962 A1 Apr. 24, 2003

(30) Foreign Application Priority Data

Dec. 6, 2000 (DE) .......................................... 100 60 964

(51) Int. Cl.[7] ................................................ G01W 1/00
(52) U.S. Cl. ................................................... 73/170.17
(58) Field of Search .......................... 73/170.17, 170.21, 73/170.241, 170.18, 170.19; 250/227.25, 539.1, 341.8; 356/445; 307/10.1

(56) References Cited

U.S. PATENT DOCUMENTS

| | | | | |
|---|---|---|---|---|
| 3,965,356 | A | * | 6/1976 | Howarth ...................... 250/343 |
| 4,859,867 | A | * | 8/1989 | Larson et al. .............. 307/10.1 |
| 5,661,303 | A | | 8/1997 | Teder |
| 5,898,183 | A | | 4/1999 | Teder |

FOREIGN PATENT DOCUMENTS

| DE | 197 01 258 A | 7/1997 |
|---|---|---|
| DE | 198 21 335 A | 11/1998 |
| DE | 198 15 748 A1 | 10/1999 |

\* cited by examiner

*Primary Examiner*—William Oen
(74) *Attorney, Agent, or Firm*—Michael J. Striker

(57) ABSTRACT

A rain sensor (10), in particular for a motor vehicle, is shown, having at least one transmitter (20) emitting radiation in the operating state, and at least one receiver (22) at least partially sensitive to the radiation from the transmitter (20), and a substantially flat light-conducting body (14) that is capable of being coupled nearly parallel to a surface of a wettable window pane (12) of the motor vehicle, and comprising structures (18a, 18b) for directing and catching the radiation from the transmitter (20), whereby the structures (18a) for directing the radiation are different from the structures (18b) for catching the radiation, and they have radiation-concentrating properties.

9 Claims, 2 Drawing Sheets

RAIN SENSOR WITH A LIGHT-CONDUCTING BODY FOR A MOTOR VEHICLE

BACKGROUND OF THE INVENTION

The invention concerns a rain sensor according to the general class of the independent claim. Numerous rain sensors have already been made known, for example in DE 198 15 748 A1, that measure the wetting of the windshield of a motor vehicle with the aid of a transmitter and a receiver via the principle of total reflection. Said rain sensors comprise a light-conducting body that is designed substantially flat in shape and is arranged on the interior of the motor vehicle nearly parallel to the surface of the windshield.

ADVANTAGES OF THE INVENTION

The rain sensor according to the invention having the features of the main claim has the advantage that the respective focussing needs can be taken into account by means of various structures for directing and catching radiation, by way of which the sensitivity of the rain sensor is improved.

Advantageous further developments and improvements of the features indicated in the main claim result from the measures listed in the dependent claims.

It is particularly advantageous when the structures for directing the radiation toward the window pane are spherical in character, and the structures for catching the radiation are non-spherical in character. In this fashion, a maximum amount of light is directed toward the windshield and, simultaneously, only the radiation relevant to the measurement of precipitation is reflected by the windshield. This increases the size of the the measuring regions on the windshield, therefore increasing the signal-to-noise margin of the rain sensor signal.

If the structures for directing the radiation are formed as spherical segments, they are very easy to produce as spherical structures, in particular when the light-conducting body is an injection-molded part.

It is furthermore advantageous when the structures for catching the radiation comprise cylindrical segments, the cover surface of which is formed as a non-spherical lens. The cylindrical segments bring about a shield-like effect, so that only the desired radiation can pass through the light-conducting body to the receiver. The non-spherical lenses make it possible to move the receivers closer to the light-conducting body than would be possible with spherical lenses.

It is particularly advantageous when the concentrated beams meet outside of the geometrical center line of the cylindrical segment. Due to this squinting lens, the optical components such as transmitter and receiver can be moved even closer to the light-conducting body, which further reduces the proportions of stray illumination.

If the surface of the light-conducting body capable of being coupled to the window pane comprises a slight convex arch, air bubbles that can form in the coupling region when the light-conducting body is coupled to the window pane are advantageously prevented. Additionally, tension is produced over the entire light-conducting body during installation, with the effect that changes in shape due to temperature or ageing, for example, can be offset.

If multiple structures for directing and catching radiation are provided in each case that are arranged in pairs in each case, a plurality of measuring paths can be arranged on the narrowest space, and the dimensions of the rain sensor can be limited to a minimum. This is particularly advantageous because the rain sensor can be arranged on the windshield in such a fashion that it does not obstruct the driver's vision.

It is particularly advantageous when four structures each are provided for directing and catching radiation that are arranged in such a fashion that the measuring paths form a parallelogram when projected onto the window pane. By means of such an arrangement, four measuring paths can be realized using two transmitters and two receivers, whereby sufficient space is available in the center of the parallelogram for arranging a further sensor or a heating device, for example. Additionally, due to the fact that each transmitter transmits in multiple measuring paths and each receiver receives from multiple directions, costly optical semiconductor components can be spared.

If the surface of the light-conducting body capable of being coupled to the window pane is at least partially provided with one component of a multiple-component adhesive, the light-conducting body can be installed quickly and securely to the window pane.

SUMMARY OF THE DRAWINGS

An exemplary embodiment of the invention is presented in the drawing and described in greater detail in the subsequent description.

DESCRIPTION OF THE PREFERRED EMBODIMENTS

Figure 1:
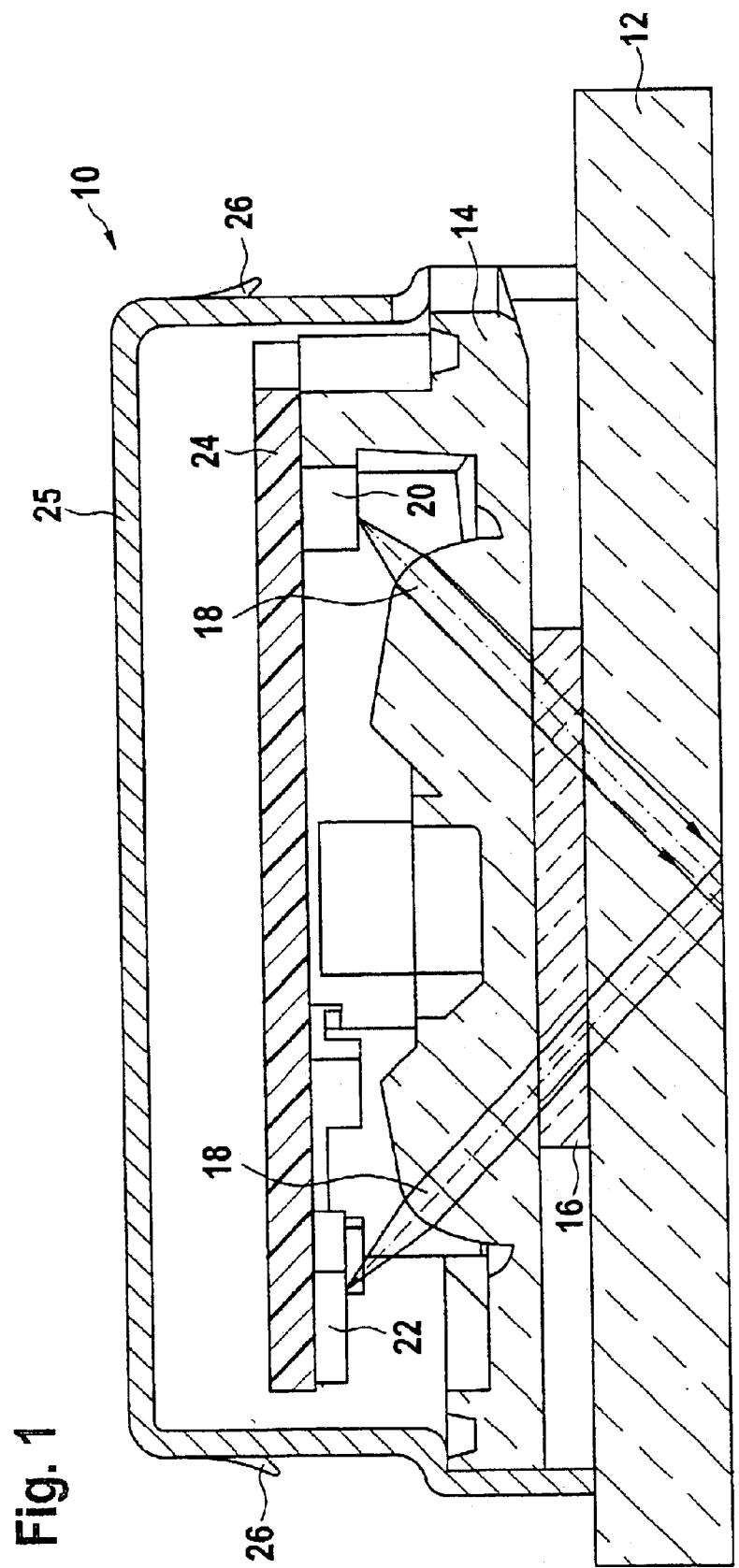
FIG. 1 shows a sectional drawing of a rain sensor according to the invention.

A sectional drawing of a rain sensor 10, according to the invention, on a window pane 12 is shown in FIG. 1. The rain sensor 10 comprises a light-conducting body 14 that forms a cover of the rain sensor 10. With this light-conducting body 14, the rain sensor 10 is adhered to the window pane 12 via a coupling medium 16. A non-adhesive coupling medium can also be used, of course, if the fastening is performed via a separate fastening device, for example.

The light-conducting body 14 comprises structures 18a, 18b that direct the light from the transmitter 20 via the coupling medium 16 toward the window pane 12 and catch the light totally-reflected by the window pane 12 via the coupling medium 16 once again and direct it to the receiver 22. Transmitter 20 and receiver 22 are arranged on a common board 24 formed as a printed-circuit board. This board 24 is arranged in the rain sensor 10 inside a housing 25 nearly parallel to the window pane 12, in such a manner, in fact, that the transmitter 20 and the receiver 22 are mounted nearly over the structures 18a, 18b. For this purpose, the light-conducting body can also comprise not shown domes that can grip in corresponding bores in the board 24 and in this fashion make it easier to mount the transmitter and receiver on the structures 18a, 18b. The receiver 22 and/or transmitter 20 are mounted in such a fashion, of course, that the sensitive regions of the receiver 22 and/or the transmitter 20 are arranged in such a manner as to obtain maximum sensitivity in the focussing region of the radiation-concentrating structures 18a, 18b.

The radiation from the transmitter 20 is directed toward the window pane 12 at an angle of approximately 45°, reflected at least partially on the wettable surface of the window pane 12 depending on the amount of wetting and reflected by the window pane 12 at an angle of approximately 45°, and sent to the receiver 22.

The housing 25 can also comprise lobes 26 on its outside that serve to put a second housing over the entire rain sensor 10, in particular when special requirements are placed on the housing. This also applies, of course, independently of the special design of the light-conducting body 14.

Figure 2:
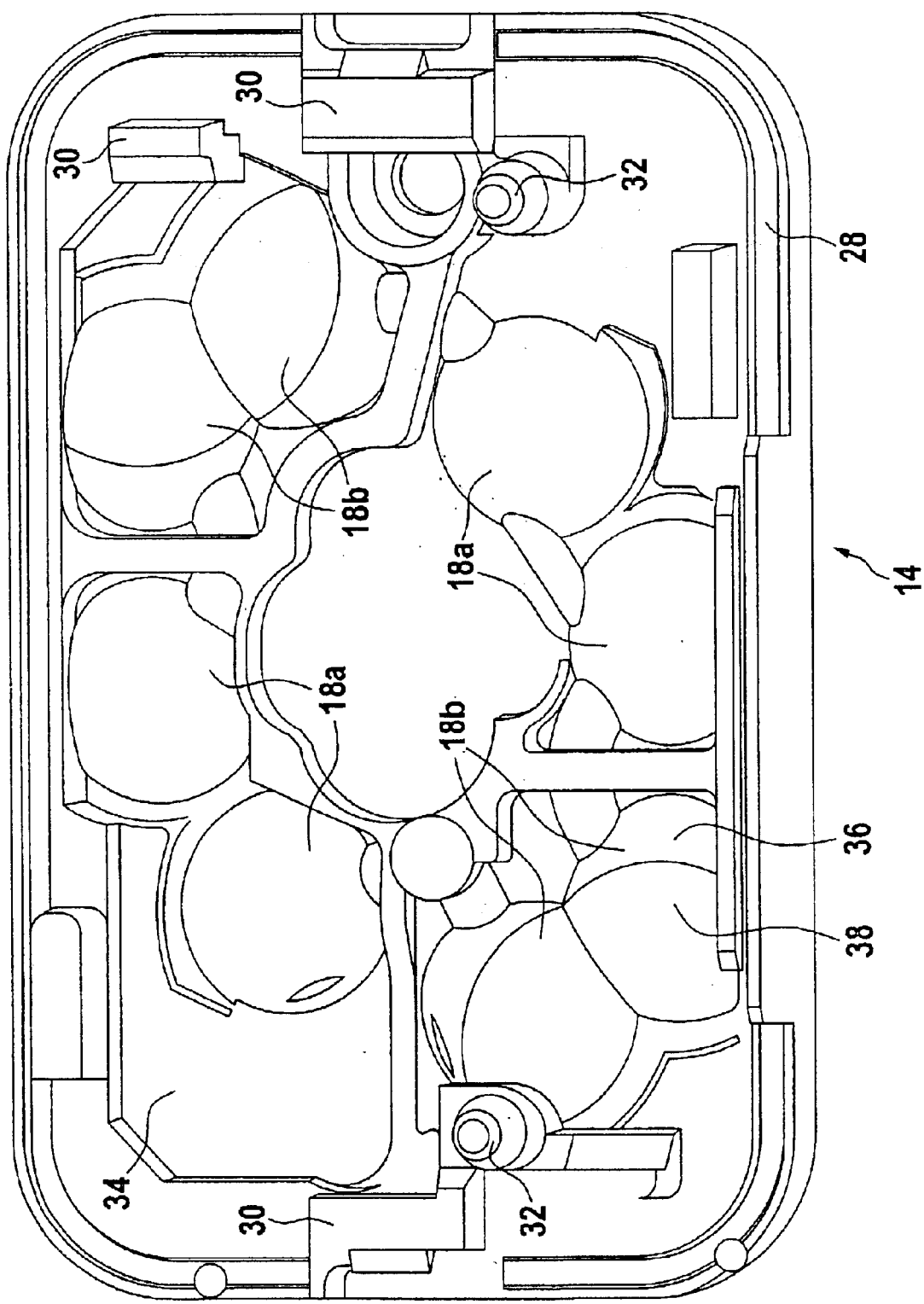
FIG. 2 shows a perspective view of a light-conducting body of a rain sensor according to the invention.

FIG. 2 shows a perspective view of a light-conducting body 14 in detail. Said light-conducting body is substantially rectangular in shape and provided with a circumferential groove 28. Further fastening elements 30 are also arranged in the region of this groove 28 that fasten the light-conducting body to the housing. The light-conducting body comprises the domes 32 for mounting the board 24 shown in FIG. 1, which said domes rise out of the light-conducting body 14 cylindrically perpendicular to the window pane 12. The structures 18a, 18b are arranged in pairs in each case nearly in the center of the rectangle of the light-conducting body 14. The structures 18a serve to direct the radiation from the transmitter 20, and the structures 18b serve to catch the radiation totally-reflected by the window pane and focus it on the receiver 22.

The structures 18a, which serve to direct the radiation, are formed as spherical segments that lie directly on the flat base surface 34 of the light-conducting body 14. Since the transmitters 20 are arranged over the structures 18a, distant beams are also still refracted in the direction of the window pane 12, which increases the total amount of radiation directed toward the window pane in relation to the lens structure according to the related art.

The structures 18b, which serve to catch and focus the radiation on the receiver 22, substantially comprise a cylindrical segment 36, on the cover surface of which a non-spherical lens 38 is integrally molded. Since the totally-reflected radiation—which reflects the measuring signal—is to be focussed on the receiver 22 with the greatest possible accuracy, these non-spherical structures 18b are particularly well-suited for catching radiation. The non-spherical lens is thereby shaped and arranged in such a fashion that its focussing region exactly fills the sensitive surface of the receiver 22.

By arranging the structures 18a and 18b in pairs, four measuring paths are produced with the aid of two transmitters 20—each of which is arranged nearly over one structure pair 18a—and two receivers—each of which is arranged nearly over one structure pair 18b, which said measuring paths form a parallelogram when projected onto the window pane 12. In this fashion, additional installation space is available in the center of the parallelogram in which a further sensor, e.g., a luminosity sensor or a temperature sensor, can be arranged. The arrangement of a heating element for heating the sensor device or the window pane 12 in the measuring region is also feasible. If an optical sensor is arranged in this central region, said optical sensor can be optically separated from the measuring paths, e.g., by means of ridges raised in the manner of a wall, in order to prevent any disturbances of the precipitation measurements by irradiation of daylight. This is independent of the special design of the structures 18a and 18b, however. It is also possible, of course, to form the structures 18a, 18b not in the fashion of a lens, as shown in the Figures, but in the fashion of a mirror. A mixed design is also feasible, in which one portion of the structures 18a are formed in the fashion of a lens for directing radiation, and a further portion is formed in the fashion of a mirror. The same applies as well for the structures 18b for catching radiation, of course.

We claim:

1. A rain sensor (10), in particular for a motor vehicle, having at least one transmitter (20) emitting radiation in the operating state, and at least one receiver (22) at least partially sensitive to the radiation from the transmitter (20), and a substantially flat light-conducting body (14) that is capable of being coupled nearly parallel to a surface of a wettable window pane (12) of the motor vehicle, and comprising structures (18a, 18b) for directing and catching the radiation from the transmitter (20), wherein the structures (18a) for directing the radiation are different in form from the structures (18b) for catching the radiation, wherein the structures (18b) for catching the radiation comprise radiation-concentrating properties, and wherein the structures (18a) for directing the radiation are formed as a spherical segment.

2. The rain sensor (10) according to claim 1, wherein the structures (18a) for directing the radiation are formed as a spherical segment.

3. The rain sensor (10) according to claim 1, wherein the structures (18b) for catching the radiation comprise a cylindrical segment, in particular a slanting cylindrical segment, through which a geometrical center line is capable of being construed parallel to the cover surface of the cylindrical segment, and the regions in which the caught radiation is concentrated lie outside of the geometrical center line.

4. The rain sensor (10) according to claim 1, wherein the surface of the light-conducting body capable of being coupled to the window pane (12) has a convex arch.

5. The rain sensor (10) according to claim 1, wherein a plurality of structures (18a, 18b) for directing and catching radiation are provided that are arranged in pairs in each case.

6. The rain sensor (10) according to claim 1, wherein four structures (18a, 18b) each are provided for directing and catching radiation, wherein said structures are arranged in such a fashion that the beam paths determined by the arrangement of the structures (18a, 18b) form a parallelogram when projected onto the window pane (12).

7. The rain sensor (10) according to claim 1, wherein the surface of the light-conducting body (14) capable of being coupled to the window pane (12) is at least partially provided with one component of a multiple-component adhesive.

8. The rain sensor (10) according to claim 1, wherein a plurality of structures (18a, 18b) is associated with one transmitter (20) in each case and/or one receiver (22) in each case.

9. A rain sensor (10), in particular for a motor vehicle, having at least one transmitter (20) emitting radiation in the operating state, and at least one receiver (22) at least partially sensitive to the radiation from the transmitter (20), and a substantially flat light-conducting body (14) that is capable of being coupled newly parallel to a surface of a wettable window pane (12) of the motor vehicle, and comprising structures (18a, 18b) for directing and catching the radiation from the transmitter (20), wherein the structures (18a) for directing the radiation are different in form from the structures (18b) for catching the radiation, wherein the structures (18b) for catching the radiation comprise radiation-concentrating properties, wherein the structures (18a) used to direct the radiation are spherical in character, and the structures (18b) used to catch the radiation are of non-spherical character, wherein the structures (18a) for directing the radiation are formed as a spherical segment, wherein the structures (18b) for catching the radiation have a cylindrical segment, and the cover surface is formed as a non-spherical lens.

* * * * *